United States Patent [19]
Smith, Jr.

[11] 3,886,089
[45] May 27, 1975

[54] DILITHIO ALKANE CATALYST COMPOSITIONS AND METHOD FOR THE PREPARATION THEREOF

[75] Inventor: William Novis Smith, Jr., Exton, Pa.

[73] Assignee: Foote Mineral Company, Exton, Pa.

[22] Filed: Nov. 14, 1973

[21] Appl. No.: 415,729

[52] U.S. Cl. ...... 252/429 R; 252/431 L; 260/665 R; 260/93.5 R; 260/94.2 M; 260/88.2 B
[51] Int. Cl. .............................................. C07f 1/02
[58] Field of Search ................... 252/431 L, 429 R; 260/665 R

[56] References Cited
UNITED STATES PATENTS

| | | | |
|---|---|---|---|
| 2,947,793 | 8/1960 | Eberly | 252/431 L X |
| 3,439,053 | 4/1969 | Hoeg | 260/665 R |
| 3,649,701 | 3/1972 | Smith | 260/665 R |

Primary Examiner—Patrick P. Garvin
Attorney, Agent, or Firm—Howson and Howson

[57] ABSTRACT

Novel dilithioalkane catalyst compositions for use as polymerization initiators are prepared by simultaneously reacting an alkyl monohalide and a hydrocarbyl dihalide with powdered lithium metal in a hydrocarbon solvent under an inert atmosphere preferably at a reflux temperature in the range from about 10°C, to about 100°C., and separating the resulting precipitate containing the desired insoluble dilithioalkane catalyst from the reaction mixture; the molar ratio of the alkyl monohalide to the hydrocarbyl dihalide being in the range from about 0.3 to about 4:1; the powdered lithium metal being employed preferably in just less than the stoichiometric amount to react with all of the alkyl monohalide and hydrocarbyl dihalide; the hydrocarbyl dihalide being selected from the group consisting of 1,4-dichlorobutane and those hydrocarbyl dihalides or polyhalides having a hydrocarbyl radical selected from the group consisting of the straight chain alkyl, cycloalkyl and aralkyl radicals containing from 5 up to about 30 carbon atoms in the alkyl chain, and having at least two halide atoms which may be the same or different selected from the group consisting of the iodide, bromide and chloride atoms, and being located at least 5 carbon atoms apart on the alkyl radical; the alkyl monohalides having an alkyl radical selected from the group consisting of primary and secondary alkyl radicals having from 3 to about 20 carbon atoms, and a halide atom selected from the group consisting of the iodide, bromide and chloride atoms, and forming a monolithioalkane compound soluble in the reaction mixture. The novel catalyst compositions are made up to about 12 to about 80% active dilithioalkane catalyst and about 20 to about 88% catalytically inert material consisting principally of lithium halide and trace amounts of byproducts and unreacted lithium metal.

7 Claims, No Drawings

DILITHIO ALKANE CATALYST COMPOSITIONS AND METHOD FOR THE PREPARATION THEREOF

BACKGROUND OF THE INVENTION

1. Field Of The Invention

Dilithioalkane compounds, sometimes referred to as alkyl dilithium compounds, have become important as catalysts or polymerization initiators for 1,3-diolefins and active vinyl compounds, especially block polymers and difunctially terminated polymers. One method for preparing these compounds is by reacting dihaloalkanes (alkyl dihalides) with lithium metal in the presence of diethyl ether. This method of preparation has a serious disadvantage in that diethyl ether is a material which is slowly reactive toward the catalyst itself and which is also highly deleterious in the diolefin polymerization reaction. Indeed, even when the dilithioalkane compounds are to be used for other purposes than the initiation or polymerization, such as synthetic applications, the presence of the polar ether is undesirable because of the degradation of the dilithioalkane compounds over a period of time. Other methods of the prior art for the preparation of dilithioalkane compounds have employed organic bases. Due to the reactivity of the dilithioalkanes toward such polar bases, their presence obviously tends to reduce the activity of such a catalyst.

2. The Prior Art

It has been proposed in the prior art to prepare dilithioalkane or alkyl dilithium compounds without the use of an organic base or diethyl ether. One such method is described in Eberly U.S. Pat. No. 2,947,793 issued Aug. 2, 1960 in which it is proposed to react finely divided lithium metal with an alkyl dihalide by grinding the two materials together in the presence of a hydrocarbon solvent. This patent recognizes that the presence of diethyl ether is undesirable and suggests as suitable reaction media solvents such as hydrocarbons containing 4 to 14 carbon atoms free from ethylenic unsaturation such as pentane, hexane, petroleum, ether, kerosene, benzene, toluene, xylene and the like. It is stated that higher hydrocarbon liquids containing up to 30 or 40 carbon atoms such as mineral oil, lubricating oil and the like may also be employed. While this method does avoid the use of diethyl ether, it is noted that the reaction is very slow, requiring from 18 to 72 hours to progress to an economic extent such as 90% yield or better.

Kahle, et al., U.S. Pat. No. 3,278,617 issued Oct. 11, 1966, also recognizes the desirability of avoiding diethyl ether and suggests a specific method for the preparation of dilithium dihydroanthracene initiators by the reaction of certain organo monolithium compounds with a dihydroanthracene in a hydrocarbon reaction medium. Here again, a hydrocarbon containing from 4 to 10 carbon atoms is recommended as the reaction medium.

Workers in the art have found it virtually impossible to prepare dilithioalkane compounds by the addition of an alkyl dihalide to lithium metal in a hydrocarbon solvent. This is due to the fact that the desired product, the dilithioalkane compound, is virtually insoluble in the reaction mixture and tends to coat the lithium metal reactant, thus slowing the reaction.

It is apparent, therefore, that a need remains in the art for a simple, efficient and economic method for the preparation of dilithioalkane catalyst compositions directly useful for synthesis or as polymerization catalysts or initiators.

Therefore, it is a primary object of the present invention to provide a method for the formation of dilithioalkane compounds which does not require the use of diethyl ether or any other polar solvent.

It is another object of the invention to provide a method for the preparation of such dilithioalkane catalyst compositions without the use of an organic base.

It is still another object of the present invention to provide a method for the preparation of dilithioalkane compounds which is relatively rapid, efficient and economical.

It is another object of the invention to provide a method for the preparation of novel dilithioalkane-containing compositions which are directly useful as polymerization catalysts or initiators without purification.

The foregoing and other advantages of the present invention and compositions will become apparent from the following description of the invention.

SUMMARY OF THE INVENTION

The present invention relates to a method for the preparation of novel dilithioalkane catalyst compositions particularly useful as polymerization initiators or for synthesis which involves reacting a mixture of an alkyl monohalide and a hydrocarbyl dihalide, with powered lithium metal in a hydrocarbon solvent under an inert atmosphere at a temperature in the range from about 10°C. to about 100°C. and separating the resulting precipitate containing dilithioalkane catalyst from the reaction mixture. The molar ratio of the alkyl monohalide to the hydrocarbyl dihalide reactant in the mixture may range from about 0.3 to about 4:1. The powdered lithium metal is preferably employed in just less than the stoichiometric amount required to react with all of the alkyl monohalide and hydrocarbyl dihalide reactants. The hydrocarbyl dihalide employed in the process may be 1,4-dichlorobutane or any higher alkyl dihalide having a hydrocarbyl radical selected from the group consisting of straight chain alkyl, cycloalkyl and aralkyl radicals containing from 5 up to about 30 carbon atoms in the alkyl chain, and having two halide atoms which may be the same or different, selected from the group consisting of the iodide, bromide and chloride atoms, at least 5 carbon atoms apart in the alkyl radical; by this it is meant that there are at least 3 carbon atoms between the carbon atoms in the chain to which the halide atoms are attached. The alkyl monohalide reactant has an alkyl radical selected from the group consisting of primary and secondary alkyl radicals containing from 3 to about 20 carbon atoms and a halide atom selected from the group consisting of iodide, bromide and chloride. It is also necessary that the alkyl monohalide reactant be one which produces a monolithioalkane compound which is soluble in the reaction mixture to facilitate its separation from the desired dilithioalkane product.

The novel catalyst compositions produced by the method of the present invention are composed of about 12 to about 80% active dilithioalkane catalyst and about 20 to about 88% of catalytically inert material. The catalytically inert material in the catalyst compositions is made up primarily of lithium halide which acts as an inert diluent in the compositions. The catalytically inert portion of the catalyst compositions may also contain from 0 up to about 2%, based on the weight of the entire catalyst composition, of minor contaminants, including lithium metal, which are also inert in the polymerization reaction.

The process of the invention may be represented by the following equation:

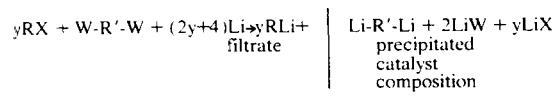

wherein R is a primary or secondary alkyl radical containing from 3 to about 20 carbon atoms R' is tetramethylene when W is Cl, or any straight chain alkyl, cycloalkyl, and aralkyl radical containing from 5 to 30 carbon atoms on which the halide groups W are at least 5 carbon atoms apart.

X is Cl, Br, I
W is Cl, Br, I
$y$ is 0.2 to 4.

It will be seen from the foregoing equation that when one mole of the hydrocarbyl dihalide is used, the stoichiometric amount of lithium metal is $2y + 4$ or four moles plus twice the molar amount of alkyl monohalide used. It is preferred, of course, to use 2 to 5% less than the stoichiometric amount as noted above to ensure substantially complete reaction of the lithium metal in order to minimize its presence in the precipitate. It should also be noted that the foregoing equation shows that the filtrate will contain the soluble monolithioalkane product thus separating it from the desired dilithioalkane catalyst. The equation also shows that the precipitate, which is the novel catalyst composition of the invention, contains in addition to the desired dilithioalkane, two moles of lithium halide derived from halide groups of the hydrocarbyl dihalide reactant and $y$ moles of lithium halide derived from the halide group of alkyl monohalide reactant. These mixed lithium halides are inert diluents and need not be separated from the novel catalyst compositions.

As noted above, it is an object of the present invention to avoid the use of an organic base or any polar solvent such as diethyl ether in the reaction medium. The reaction medium employed in the present invention may, therefore, be any suitable non-polar liquid hydrocarbon, which does not contain any hetero atom such as sulfur, oxygen, halogen or basic nitrogen. The preferred reaction media include butane, pentane, hexane, cyclohexane, benzene, toluene or even higher boiling hydrocarbons such as mineral oil. These materials may also be used to wash the precipitate obtained in the process.

It is preferred that the reactants employed in the process be in highly pure form, therefore, the hydrocarbyl dihalide and alkyl monohalide materials may be purified by conventional procedures if necessary.

The reaction is carried out by simply mixing the liquid alkyl monohalide and hydrocarbyl dihalide reactants in a suitable reaction vessel under an inert atmosphere which may be argon, helium or the like. Nitrogen gas is not a suitable inert atmosphere during the reaction since it may react with the lithium metal. The reaction may be carried out in ordinary glass laboratory apparatus sealed from the atmosphere provided with suitable stirring means. As noted above, the reaction is normally conducted at atmospheric pressure at a temperature in the range from about 10° up to about 100°C., but is preferably carried out at about 35° to about 40°C., or the reflux temperature of the reaction mixture which will, of course, depend upon the boiling point of the reaction mixture.

In a preferred embodiment, the powdered lithium metal is added to a stirred reaction medium, such as pentane, previously charged to the reaction vessel. The concentration of lithium metal in the initial dispersion may be in the range from 1 up to about 40%, preferably about 5 to 10%, by weight, of the dispersion. While pure lithium metal may be employed, as is known in the art, it is generally preferable to use lithium which contains about 1% of sodium to make it more reactive.

When the reaction has proceeded to completion, the reaction mixture is filtered under dry argon or helium by conventional means to separate the solid catalyst-containing composition which is then washed with fresh portions of a suitable hydrocarbon solvent such as pentane, for example. The washed precipitate is then blown dry and stored in a suitable bottle under dry argon, helium or other suitable inert atmospheres.

The novel catalyst compositions obtained as above containing about 12 to about 80% active dilithioalkane catalyst together with about 20 to 88% of inert diluents consisting principally of lithium halides, and may be used as such without further purification, in the polymerization of diolefins according to procedures known in the art, such as those described in Cooper U.S. Pat. No. 3,030,346 issued Apr. 17, 1962, or for other syntheses.

DETAILED DESCRIPTION OF THE INVENTION

Preferred General Procedure For The Preparation Of Dilithioalkane Compositions A 500 ml, three-neck round bottom glass reaction flask is fitted with a heating mantle, a pressure equalizing dropping funnel, a thermometer, a water cooled reflux condenser, and a suitable stirrer. This apparatus is then thoroughly dried and purged with argon prior to charging. An appropriate volume of lithium metal or preferably 1% sodium-lithium metal powder is slurried in a suitable reaction medium such as pentane and the dispersion is heated to reflux temperature which will be at a temperature within the range from about 10°C. to about 100°C. depending upon the hydrocarbon reaction medium employed. Then about 5 to 10% of a previously prepared mixture of alkyl monohalide and hydrocarbyl dihalide is added through the pressure equalizing dropping funnel. After initiation of the reaction in this way, the heating mantle is removed, since the reaction is exothermic. The remainder of the halide mixture is then added dropwise at a sufficient rate to maintain normal reflux conditions. The time required for complete addition of the halide mixture varies from about 1 to about 3 hours depending upon the reactants employed.

After the addition of the mixed halides is complete, the product slurry is stirred for an additional period of about 1 to 4 hours. The reaction mixture is then filtered under argon in a conical fritted glass filter with a porosity of about 10 to 20 microns. The resulting filter cake is washed four times with fresh portions of a hydrocarbon solvent, such as pentane, each portion being approximately equivalent in volume to the volume of the filter cake. If it is desired to analyze the filtrate, it should be kept separate from the wash liquid. The washed precipitate is then blown dry with argon and bottled under the same gas by conventional techniques and stored for use in this form as a polymerization catalyst, initiator or synthetic reagent.

The lithium used in the specific examples below was a lithium-sodium alloy which contained about 1% sodium and had a particle size of about 70 to 100 microns.

The reaction medium and washing liquid, which may be any suitable liquid, non-polar hydrocarbon, as noted above, should be relatively pure and dry. A pure grade of pentane (99.4 mol % purity) was dried by conventional procedures and stored over sodium metal wire prior to use in the specific examples given below.

Commercially available alkyl dihalide compounds were employed when available in the specific examples below after being purified by distillation under vacuum according to conventional procedures; the alkyl dichlorides and dibromides being distilled from calcium hydride ($CaH_2$), and the iodides being distilled from copper metal powder. The preferred alkyl monohalides employed in the following examples, i.e., the normal, secondary and butyl chlorides, were obtained from commercial sources and used without purification. The dilithioalkane-containing reaction products were sampled and analyzed in each case and the concentration of active catalyst recorded.

EXAMPLE I

Preparation Of A 1,4-Dilithiobutane-Containing Catalyst Composition

The apparatus and general operating procedure set forth above were employed in this and the following examples. In this example, the reaction medium was 300 ml of 99.4 mol % pure n-pentane in which was dispersed 2.13 mols of lithium-sodium alloy (1% sodium, particle size 70–100 microns) under argon. After the lithium dispersion was introduced to the reaction vessel and warmed to the reflux temperature (about 36°C.), about 10% of a mixture of 0.40 moles (50.8 g.) of 1,4-dichlorobutane and 0.32 moles (29.8 g.) of n-butyl chloride was introduced to the reaction vessel through the pressure equalizing dropping funnel. The heating mantle was removed as the exothermic reaction began. The amount of lithium-sodium alloy employed was about 95% of the theoretical amount to react with all of the mixed halides. The reaction mixture was stirred constantly and the remainder of the mixed halides was added dropwise at a rate sufficient to maintain vigorous reflux conditions. The reaction ran well and went to completion without incident. On filtration of the reaction mixture under argon according to the general procedure set forth above, a light tan solid was isolated from the filtrate. On analysis this material was found to contain about 30.45% by weight of active 1,4-dilithiobutane catalyst, the remainder being primarily lithium chloride which is inert in the polymerization of diolefins.

EXAMPLE II

Preparation Of A 1,5-Dilithiopentane-Containing Catalyst Composition

The procedure of Example I was repeated substituting 56.5 g (0.4 moles) of 1,5-dichloropentane for the dichlorobutane and using 8.2 g. (1.18 moles) or about 95% of the stoichiometric amount of lithium. This reaction also ran well and produced a light tan solid which on analysis was found to contain 31.58% of the desired 1,5-dilithiopentane active catalyst.

The same general procedure was repeated but employing 200 ml of n-pentane as the reaction medium, 57.5 g (0.25 moles) of 1,5-dibromopentane and 23 g. (0.25 moles) of n-butyl chloride as reactant, and 9.7 g. (1.4 moles) of lithium metal. This reaction, involving a dibromide, also ran well at reflux temperature and produced a light tan solid which when analyzed was found to contain about 19.84% of the desired 1,5-dilithiopentane catalyst. The inert solid diluent in the catalyst composition in this case was a mixture of lithium chloride and lithium bromide.

EXAMPLE III

Preparation Of A 1,6-Dilithiohexane-Containing Catalyst Composition

A. The general procedure was repeated using 346 g. (2.23 moles) of 1,6-dichlorohexane, 82 g. (0.89 moles) of n-butyl chloride and 67 g. (9.7 moles) of the 1% sodium-lithium powder in 2000 ml of n-pentane in a 5 liter flask. The reaction ran well at reflux temperature and went to completion to produce a light tan solid product which when analyzed was found to contain about 41.61% of the desired 1,6-dilithiohexane catalyst.

B. Another run was conducted on a smaller scale in a one liter flask using 196 g. (0.8 moles) of 1,6-dichlorohexane, 18.5 g. (0.20 moles) of n-butyl chloride and 25 g. (3.6 moles) of lithium in 400 ml of n-pentane. This reaction did not run and was discarded. It is believed that the failure of this run was due to the fact that the molar ratio of n-butyl chloride to 1,6-dichlorohexane was only 0.2:0.8 which is below the 0.3 to 1 minimum ratio required for successful operation.

C. Still another run was conducted in the one liter flask using 38 g. (0.25 moles) of 1,6-dichlorohexane, 23 g. (0.25 moles) of n-butyl chloride, 9.7 g (1.4 moles) of lithium powder in 200 ml of benzene as the reaction medium. This reaction ran very well at 35°–40°C. and went to completion to produce a light purple solid which on analysis was found to contain about 37.89% of the desired 1,6-dilithiohexane. It is noted that the molar ratio of n-butyl chloride to 1,6-dichlorohexane in this run was 1:1.

D. In order to establish the importance of employing a mixture of an alkyl monohalide and hydrocarbyl dihalide in the process of the invention, a run was made in which only the monohalide was added initially to the catalyst and reaction medium. More specifically, the reaction vessel was charged with a dispersion of 0.2 moles of n-butyl lithium (15.2% in cyclohexane) and 5.6 g. (0.8 moles) of lithium in 150 ml of additional cyclohexane as the reaction medium. After bringing this slurry to reflux, 31 g. (0.2 moles) of 1,6-dichlorohexane was added according to the general procedure. Although a slight exotherm was noted initially, the reaction was stopped due to coating of the lithium metal and the run was discarded as a complete failure.

E. Another run was conducted using 98 g. (0.4 moles) of 1,6-dibromohexane, 18.5 g. (0.2 moles) of n-butyl chloride, 13.9 g. (2.0 moles) of 1% sodium-lithium powder and 400 ml of n-pentane as the reaction medium. This reaction also ran well at reflux but was less exothermic than that employing the corresponding dichlorohexane. The light tan solid product analyzed to contain 26.13%, 1,6-dilithiohexane.

F. Another run was conducted using 38 g. (0.25 moles) 1,6-dichlorohexane, 23 g. (0.25 moles) sec-butyl chloride and 9.7 g. (1.4 moles) of 1% sodium-lithium in 250 ml of n-pentane. After bringing the charge to reflux temperature according to the general procedure, 2 ml of additional pure sec-butyl chloride was added to initiate the reaction before addition of the mixed monochloro- and dichloroalkanes. This reaction ran to completion, although it was less exothermic than reactions employing the n-butyl chloride. The solid analyzed about 33% 1,6-dilithiohexane.

G. In another run, 38 g. (0.25 moles) of 1,6-dichlorohexane, 23 g. (0.25 moles) of tert-butyl chloride and 1.4 moles of 1% sodium-lithium were reacted in 200 ml of n-pentane according to the general procedure. This reaction was initiated with 2 ml of pure tert-butyl chloride at the reflux temperature. The reaction of the mixture of the tert-butyl chloride and 1,6-dichlorohexane would not run at reflux, however, and was discarded. The tertiary butyl chloride does not, therefore, provide the advantages of the present invention afforded by the primary and secondary alkyl halides.

H. In still another run, 169 g. (0.5 moles) of 1,6-diiodohexane, 28 g. (0.25 moles) n-butyl chloride and 2.38 moles of lithium were reacted in 500 ml of n-pentane in a one liter flask. The reaction ran well at reflux and went to completion to produce a light tan solid catalyst composition containing about 20.21% of the desired 1,6-dilithiohexane; the remainder being made up principally of a mixture of lithium chloride and lithium iodide which are inert in a diolefin polymerization reaction.

EXAMPLE IV

Preparation Of A 1,9-Dilithiononane-Containing Catalyst Composition

The general procedure was followed using 100 g (0.5 moles) of 1,9-dichlorononane, 23 g. (0.3 moles) n-butyl chloride and 2.2 moles of lithium in 400 ml of n-pentane. This reaction ran well at reflux temperature and went to completion to produce a dark purple solid catalyst composition which on analysis was found to contain 39.91% of the desired 1,9-dilithiononane catalyst.

EXAMPLE V

Preparation Of A 1,10-Dilithiodecane

The general procedure was repeated with 53 g. (0.25 moles) of 1,10-dichlorodecane, 11.6 g (0.12 moles) n-butyl chloride and 1.2 moles of lithium in 200 ml of n-pentane. The reaction ran well at reflux temperature and went to completion to produce a dark purple solid catalyst composition which on analysis was found to contain about 39.3% of the desired 1,10-dilithiodecane.

EXAMPLE VI

Preparation Of A 1,12-Dilithiododecane

Another run was conducted using 48 g. (0.2 moles) of 1,12-dichlorododecane, 19 g. (0.2 moles) of n-butyl chloride, 1.14 moles of lithium and 200 ml of n-pentane as the reaction medium. The reaction ran well at reflux and went to completion to produce a dark purple solid catalyst composition containing about 32.2% of the desired 1,12-dilithiododecane catalyst.

It will be apparent to those skilled in the art that the temperature range of about 10° to 100°C. is dictated by the fact that below about 10°C. the reaction is too sluggish to be practical as a rule, and that above 100°C. the production of side products or degradation of the product may occur. Therefore, while temperatures below 10°C. and above 100°C. may be employed in particular circumstances, it is preferred to operate within the about 10° to about 100°C. range and preferably at about 35° to 40°C., or the reflux temperature of the reaction mixture.

Similarly, while the ratio of reactants may range from about 0.3 to about 4:1, and it may be possible to operate outside this range in certain circumstances, it is preferred to employ a ratio of about 0.5 to 1:1 of the monohalide to the dihalide reactant.

The stoichiometric amount of lithium or sodium-lithium alloy catalyst should, of course, be adjusted as necessary to maintain the 2 to 5% deficiency if trihalides or polyhalides are employed in place of the alkyl dihalide reactant.

While it is only necessary that the halide atoms in the hydrocarbyl dihalide be 5 carbon atoms apart, in an alkyl chain of the hydrocarbyl radical, it is preferred that the halide atoms should be in the omega positions on the alkyl chain.

While the alkyl monohalide is preferably n-butyl chloride, since this material is reactive in the presence of the alkyl dihalides and is generally available, it will be apparent to those skilled in the art that any sufficiently reactive alkyl monohalide may be employed. As noted above, this generally means the primary and secondary lower alkyl iodides, bromides and chlorides, the chlorides being preferred as more reactive. However, not only the lower alkyl halides such as isopropyl, n-butyl, sec-butyl, n-amyl, and other primary or secondary amyl isomers, but any other primary or secondary monohalide containing up to about 20 carbon atoms may be used.

The novel catalyst compositions containing about 12 to about 80% of active dilithioalkane catalyst and about 20 to about 88% of inert diluents, such as lithium halide, are ready for use as such after washing, but may be stored for long periods of time prior to use under a dry inert atmosphere such as argon, helium or even nitrogen and the like. Therefore, such catalyst compositions are "shelf-stable" under such storage conditions.

The novel catalyst compositions may be employed with advantage to initiate polymerization reactions of various types known in the art per se such as those described in Cooper U.S. Pat. No. 3,030,346 issued Apr. 17, 1962; Hsieh U.S. Pat. No. 3,193,590 issued July 6, 1965; and Kahle U.S. Pat. No. 3,296,150 issued Jan. 3, 1967, the disclosures of which are incorporated herein by reference. More specifically, the new catalyst compositions may be used with advantage in the initiation of polymerization of conjugated dienes containing from 4 to 12 carbon atoms, preferably 4 to 8 carbon atoms per molecule. Examples of suitable conjugated dienes that can be used include 1,3-butadiene, 2-methyl-1,3-butadiene (isoprene), 2,3-dimethyl-1,3-butadiene, 1,3-pentadiene, 2-methyl-1,3-pentadiene, 2,3-dimethyl-1,3-pentadiene, 3-methyl-1,3-pentadiene, 2-phenylbutadiene, 3-butyl-1,3-octadiene, 3,4-dimethyl-1,3-hexadiene, and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize.

The new catalyst compositions are of particular interest for the production of high cis polyisoprene and butadiene homopolymers and copolymers in which the conjugated diene portion has a low vinyl content.

In addition to homopolymers and copolymers of conjugated dienes, copolymers of conjugated dienes with other monomers containing a $CH_2\!=\!C\!<$ group, such as vinyl-substituted aromatic compounds, can be made using these new catalyst compositions. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include
  3-methylstyrene (3-vinyltoluene),
  3,5-diethylstyrene,
  4n-propylstyrene,
  2,4,6-trimethylstyrene,
  4-dodecylstyrene,
  3-methyl-5-n-hexylstyrene,
  4-cyclohexylstyrene,
  4-phenylstyrene,
  2-ethyl-4-benzylstyrene,
  4-p-tolylstyrene,
  3,5-diphenylstyrene,
  2,4,6-tri-tert-butylstyrene,
  2,3,4,5-tetramethylstyrene,
  4-(4-phenyl-n-butyl)styrene,
  3-(4-n-hexylphenyl)styrene-4-methoxystyrene,
  3,5-diphenoxystyrene,
  3-decoxystyrene,
  2,6-dimethyl-4-hexoxystyrene,
  4-dimethylaminostyrene,
  3,5-diethylaminostyrene,
  4-methoxy-6-di-n-propylaminostyrene,
  4,5-dimethyl-1-vinylnaphthalene,
  3-ethyl-1-vinylnaphthalene,
  6-isopropyl-1-vinylnaphthalene,
  2,4-diisopropyl-1-vinylnaphthalene,
  3,6-di-p-tolyl-1-vinylnaphthalene,
  6-cyclohexyl-1-vinylnaphthalene,
  4,5-diethyl-8-octyl-1-vinylnaphthalene,
  3,4,5,6-tetramethyl-1-vinylnaphthalene,
  3,6-di-n-hexyl-1-vinylnaphthalene,
  8-phenyl-1-vinylnaphthalene,
  5-(2,4,6-trimethylphenyl)-1-vinylnaphthalene,
  3,6-diethyl-2-vinylnaphthalene,
  7-dodecyl-2-vinylnaphthalene,
  4-n-propyl-5-n-butyl-2-vinylnaphthalene,
  6-benzyl-2-vinylnaphthalene,
  3-methyl-5,6-diethyl-8-n-propyl-2-vinylnaphthalene,
  4-o-tolyl-2-vinylnaphthalene,
  5-(3-phenyl-n-propyl)-2-vinylnaphthalene,
  4-methoxy-1-vinylnaphthalene,
  6-phenoxy-1-vinylnaphthalene,
  3,6-dimethylamino-1-vinylnaphthalene,
and the like. Block or random copolymers of conjugated dienes and vinyl-substituted aromatic compounds can be formed. The presence of a small amount of polar compound encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines such as
  2-vinylpyridine,
  4-vinylpyridine,
  3,5-diethyl-4-vinylpyridine,
  5-methyl-2-vinylpyridine,
  5-n-octyl-2-vinylpyridine,
  3-n-dodecyl-2-vinylpyridine,
  3,5-di-n-hexyl-4-vinylpyridine,
  5-cyclohexyl-2-vinylpyridine,
  4-phenyl-2-vinylpyridine,
  3,5-di-tert-butyl-2-vinylpyridine,
  3-benzyl-4-vinylpyridine,
  6-methoxy-2-vinylpyridine,
  4-phenoxy-2-vinylpyridine,
  4-dimethylamino-2-vinylpyridine,
  3,5-dimethyl-4-diamylamino-2-vinylpyridine,
  2-vinylquinoline,
  4-vinylquinoline,
  2-tert-butyl-4-vinylquinoline,
  3-methyl-4-vinylquinoline,
  3-cyclohexyl-4-vinylquinoline,
  3-methyl-4-ethoxy-2-vinylquinoline,
  1-vinylisoquinoline,
  3-vinylisoquinoline,
  4-tert-dodecyl-1-vinylisoquinoline,
  3-dimethylamino-3-vinylisoquinoline,
  4-benzyl-3-vinylisoquinoline,
  4-phenyl-1-vinylisoquinoline,
and the like.

Other polar monomers include acrylic and alkacrylic acid esters, nitriles and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N-N-dimethylacrylamide, N,N-diethylmethacrylamide, and the like. Vinylfuran and N-vinylcarbazole can also be used.

When it is desired that the polymer formed exhibit rubbery characteristics the conjugated diene should be employed as a major amount of the monomer polymerized. The initiator compositions prepared according to this invention are particularly valuable in forming these conjugated diene polymers. It should be understood, however, that these initiator compositions can also be used when preparing homopolymers or copolymers of the vinyl-substituted aromatic compounds or the polar monomers named. Also, block copolymers can be formed between the vinyl-substituted aromatic compounds and these polar monomers.

The amount of initiator employed will vary depending on the polymer prepared and particularly the molecular weight desired. In general, however, the amount of initiator employed will range from about 0.1 to 100 millimoles per hundred grams of monomer with the preferred range being from about 0.25 to 30 millimoles per hundred grams of monomer.

The polymerization reaction is generally carried out at a temperature ranging from about −100° to about 150°C., preferably from about −75° to about +75°C. The particular temperature employed will depend on both the monomers and the initiator used in preparing the polymers. It is preferred that the polymerization be carried out in the presence of a suitable diluent, such as benzene, toluene, cyclohexane, methylcyclohexane, xylene, n-butane, n-hexane, n-heptane, isooctane, or the like. Generally, the diluent is selected from hydrocarbons, for example paraffins, cycloparaffins, or aromatics containing from 4 to 10 carbon atoms per molecule.

Numerous variations in operative procedure can be employed. The process of the invention can be carried out as a batch process by charging monomer or monomers into a reactor containing initiator and diluent.

If desired, the organopolylithium initiator dispersed in an aliphatic hydrocarbon (reaction medium) can be first charged to a suitable reactor, which can contain diluent, and then charge the monomer to the reactor. The hydrocarbon diluent used for polymerization can be charged along with the initiator or monomer or both. In all cases the polymerization is preferably carried out in an inert atmosphere such as an atmosphere of nitrogen, helium, argon, or the like.

The polymers prepared can range from liquids to solid rubbery materials. The unquenched polymer solutions can be treated with various reagents to introduce functional groups replacing the terminal lithium atoms on the polymer molecule resulting from the polymerization itself. For example, polymer in solution can be contacted with carbon dioxide to replace the lithium atoms with —COOH groups. Other functional groups which can be introduced include —SH, —OH, halogen and the like.

As indicated above, the polymer products can range from liquids to rubbery materials and the liquid polymers can subsequently be cured to form solids. The polymers can be compounded by the various methods such as have been used in the past for compounding natural and synthetic rubbers using, for example, a roll mill or a Banbury mixer. Reinforcing agents such as carbon black and mineral fillers, plasticizers, vulcanizing agents, vulcanization accelerators, antioxidants, and the like such as have been employed in natural and synthetic rubbers can be used when compounding the rubbery polymers of the invention. The polymers of the invention can be blended with other polymers such as natural rubber, other synthetic rubbers, polyolefins such as polyethylene, and the like.

The polymeric product of the invention are useful as adhesives, potting compounds, sealants, tread stocks, and for making many types of molded objects.

Although the invention has been described above in conjunction with certain preferred embodiments thereof, it will be apparent to those skilled in the art that it is not restricted thereto but is entitled to a range of equivalents to be determined by the scope of the claims and the prior art.

What is claimed is:

1. A method for the preparation of dilithioalkane catalyst compositions which comprises: simultaneously reacting an alkyl monohalide and a hydrocarbyl dihalide with powdered lithium in a hydrocarbon solvent under an inert atmosphere at a temperature in the range from about 10°C. to about 100°C., and separating the resulting precipitate containing the dilithioalkane catalyst from the liquid portion of the reaction mixture; the molar ratio of said alkyl monohalide to said hydrocarbyl dihalide being in the range from about 0.3 to about 4:1; said powdered lithium being employed in just less than the stoichiometric amount to react with all of said alkyl monohalide and hydrocarbyl dihalide; said hydrocarbyl dihalide being selected from the group consisting of 1,4-dichlorobutane and hydrocarbyl dihalides having a hydrocarbyl radical selected from the group consisting of straight chain alkyl, cycloalkyl and aralkyl radicals containing from 5 up to about 30 carbon atoms in the alkyl chain, and having two halide atoms which may be the same or different selected from the group consisting of the iodide, bromide and chloride atoms, said halide atoms being attached to the alkyl radical and being at least 5 carbon atoms apart; said alkyl monohalide having an alkyl radical selected from the group consisting of primary and secondary alkyl radicals containing from 3 to about 20 carbon atoms, and a halide atom selected from the group consisting of iodide, bromide and chloride, and forming an alkyl lithium compound soluble in the reaction mixture.

2. A method according to claim 1 in which the reaction is carried out under reflux conditions.

3. A method according to claim 1 in which the hydrocarbyl radical of the hydrocarbyl dihalide contains at least 6 carbon atoms.

4. A method according to claim 3 in which the halide atoms are attached to the terminal carbon atoms in the hydrocarbyl radical.

5. A method according to claim 4 in which the molar ratio of alkyl monohalide to hydrocarbyl dihalide is in the range from about 0.5 to about 1:1.

6. A method according to claim 1 wherein the alkyl monohalide is n-butyl chloride.

7. A method according to claim 1 in which the alkyl monohalide is n-butyl chloride and the hydrocarbyl dihalide is 1,6-dichlorohexane.

* * * * *